United States Patent
VanOudenhoven et al.

(10) Patent No.: US 11,926,745 B2
(45) Date of Patent: Mar. 12, 2024

(54) BLACK INKS BASED ON BIOCHAR

(71) Applicant: SUN CHEMICAL CORPORATION, Parsippany, NJ (US)

(72) Inventors: Guy VanOudenhoven, Menasha, WI (US); Paul Sacoto, Cincinnati, OH (US); Mihaela Madaras, Cincinnati, OH (US); Josie M. Rosen, Carlstadt, NJ (US); Ralph Arcurio, Carlstadt, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 18/029,751

(22) PCT Filed: Jul. 11, 2022

(86) PCT No.: PCT/US2022/036671
§ 371 (c)(1),
(2) Date: Mar. 31, 2023

(87) PCT Pub. No.: WO2023/287701
PCT Pub. Date: Jan. 19, 2023

(65) Prior Publication Data
US 2023/0340284 A1  Oct. 26, 2023

Related U.S. Application Data

(60) Provisional application No. 63/221,153, filed on Jul. 13, 2021.

(51) Int. Cl.
*C09D 11/324*  (2014.01)
*C09D 11/08*  (2006.01)
*C09D 11/38*  (2014.01)

(52) U.S. Cl.
CPC ............ *C09D 11/08* (2013.01); *C09D 11/324* (2013.01); *C09D 11/38* (2013.01)

(58) Field of Classification Search
CPC ........ C09D 11/08; C09D 11/324; C09D 11/38
See application file for complete search history.

(56) References Cited

U.S. PATENT DOCUMENTS

| | | | | |
|---|---|---|---|---|
| 4,531,994 A | * | 7/1985 | Holtrop | G10K 11/168 428/319.7 |
| 5,959,020 A | * | 9/1999 | Oliveri | C09D 4/06 522/63 |
| 5,965,647 A | * | 10/1999 | Catena | C09D 11/10 524/270 |
| 2005/0143488 A1 | * | 6/2005 | Dandreaux | C09D 11/08 524/270 |
| 2006/0252914 A1 | * | 11/2006 | Czebotar | C09F 1/00 530/210 |
| 2007/0212383 A1 | * | 9/2007 | Leeper | A01N 25/18 427/322 |
| 2020/0339832 A1 | * | 10/2020 | Sunderland | C09D 11/033 |

FOREIGN PATENT DOCUMENTS

| | | | | |
|---|---|---|---|---|
| WO | WO-2019036416 A1 | * | 2/2019 | ............ C09D 11/03 |
| WO | WO 2021/062312 A1 | | 4/2021 | |
| WO | WO 2021/138184 A1 | | 7/2021 | |
| WO | WO 2021/231829 | | 11/2021 | |

OTHER PUBLICATIONS

International Search Report issued in International Application No. PCT/US2022/036671, dated Nov. 22, 2022.
Written Opinion of the International Searching Authority issued in International Application No. PCT/US2022/036671, dated Nov. 22, 2022.

* cited by examiner

*Primary Examiner* — Alexander C Kollias
(74) *Attorney, Agent, or Firm* — Marian E. Fundytus; Ostrolenk Faber LLP.

(57) ABSTRACT

The present invention provides a water-based black ink, utilizing biochar as the black pigment. The black inks of the invention contain high bio-renewable carbon content (BRC), preferably 100% BRC. The inks exhibit the physical properties required to perform according to the requirements of rotogravure and flexographic printing.

18 Claims, No Drawings

BLACK INKS BASED ON BIOCHAR

CROSS REFERENCE TO RELATED APPLICATIONS

The present application is a § 371 National Phase application based on PCT/US22/036671 filed Jul. 11, 2022, which claims the benefit of U.S. Provisional Application No. 63/221,153, filed Jul. 13, 2021 the subject matter of each of which is incorporated by reference in their entirety.

FIELD OF THE INVENTION

The present invention is related to black inks and coatings containing high bio-renewable carbon. The inks and coatings contain water, pyrolyzed cellulose (e.g. biochar) pigment, and a rosin adduct. The inks and coatings of the present invention are microwave safe.

BACKGROUND OF THE INVENTION

The printing ink industry has been attempting to construct products using a maximum quantity of renewable and responsibly sourced carbon for several years. Limitations in raw materials include the percentage of sustainably sourced carbon, and the requisite chemistries to provide acceptable physical performance.

There are two general forms of carbon materials in printing inks. The first form of carbon materials represent high BRC (bio-renewable content) materials, i.e. those with carbon originating from recently living sources (naturally derived materials). The second type are raw materials originating from ancient carbon (e.g. petroleum, coal), which are considered low or zero BRC. The responsible ink formulation trend is to replace low BRC materials with higher BRC materials to diminish the environmental and climatic impact of the final degradation product—carbon dioxide. Within the ink industry, one method for BRC determination, as a percentage of the total carbon in a material, is measuring the ratio of carbon 14 isotope (14C) to carbon 12 isotope (12C) present in the sample, and comparing to a known reference. Carbon 14 testing is widely referred to as "carbon dating," which determines the age of a sample by counting the beta radiation emitted per microgram of carbon content. With consideration of a 5730 year half-life for 14C, any samples known to contain raw materials less than 300 years since last alive, counting beta emissions can also determine the relative percentage of sustainable (BRC) carbon and the percent of ancient carbon. There are some challenges in the BRC method, including the time period from 1950 to 2015. From 1950 to 1963 above-ground nuclear detonations elevated the 14C content in the earth's atmosphere as CO2, by as much as 190%. The amount of 14C peaked in 1963, and the plants on earth have been consuming that excess 14C since, reverting 14C back to the pre-1950 levels in 2015. Those years are also part of the historic reference for BRC comparison. If the age (since living) of the test sample is known, BRC can accurately be normalized for materials living 1950 through 2015.

WO 2021/062312 discloses plant char carbon pigments, which may be provided as liquid dispersions. The plant char carbon pigments are produced by pyrolyzing carbohydrates (i.e. plant material). The pigment dispersions may comprise microfibrillated cellulose, which is included in the milling fluid. Microfibrillated cellulose is a particulate form of cellulose that is a polysaccharide that can function as an anticoagulant by intercalating in between pigment particles, but it is not soluble in water.

WO 2021/231829 describes inks and coatings having high BRC that comprise rosin adducts. There is no disclosure of biochar used as pigments.

BRIEF SUMMARY OF THE INVENTION

The present invention provides black ink and coating compositions containing 70% to 100% BRC, relative to the total carbon in the composition. The present invention is the first time that it has been shown that pyrolyzed carbohydrates (e.g. biochar) can be used in a finished ink or coating, wherein the ink or coating has the necessary physical properties to satisfy the requirements in the printing industry.

The black inks and coating compositions of the present invention comprise water, biochar pigment, and a rosin adduct, wherein the rosin adduct has 100% bio-renewable carbon (BRC) content.

In a particular aspect, the present invention provides a water-based liquid black ink composition, comprising:
 (a) 30 wt % to 50 wt % mixing vehicle, based on the total weight of the ink composition, wherein the mixing vehicle comprises:
  i. 10 wt % to 30 wt % water, based on the total weight of the mixing vehicle;
  ii. 5 wt % to 15 wt % of an L-lactic acid mixture, based on the total weight of the mixing vehicle, wherein the L-lactic acid mixture comprises 88 wt % L-lactic acid and 22 wt % water, based on the total weight of the L-lactic acid mixture;
  iii. 10 wt % to 30 wt % rosin adduct, based on the total weight of the mixing vehicle;
  iv. 10 wt % to 30 wt % of 14.5 Baume ammonia, based on the total weight of the mixing vehicle;
  v. 1 wt % to 10 wt % wax suspension, based on the total weight of the mixing vehicle, wherein the wax suspension comprises 25 wt % wax and 75 wt % water, based on the total weight of the wax suspension;
  vi. 1 wt % to 5 wt % micronized wax, based on the total of the mixing vehicle;
  vii. 0.05 wt % to 1 wt % silicone compound, based on the total weight of the mixing vehicle; and
  viii. 0.5 wt % to 3 wt % zinc chelating agent, based on the total weight of the mixing vehicle; and
 (b) 50 wt % to 70 wt % black dispersion, based on the total weight of the ink composition, wherein the black dispersion comprises:
  i. 10 wt % to 40 wt % biochar, based on the total weight of the black dispersion;
  ii. 1 wt % to 5 wt % surfactant, based on the total weight of the black dispersion;
  iii. 5 wt % to 20 wt % of the mixing vehicle of part (a), based on the total weight of the black dispersion; and
  iv. 10 wt % to 50 wt % water, based on the total weight of the black dispersion;
wherein 75% to 100% of the carbon content in the ink composition is bio-renewable carbon (BRC).

In some embodiments, the rosin adduct is a 100% BRC rosin ester resin, preferably a rosin-citrate ester resin.

In some embodiments, the ink and coating compositions of the present invention comprise 100% BRC.

These and other objects, advantages, and features of the invention will become apparent to those persons skilled in the art upon reading the details of the formulations and methods as more fully described below.

DETAILED DESCRIPTION OF THE INVENTION

The present invention is the first disclosure of 100% BRC carbon containing pigment materials (e.g. biochar) being used to produce a fully functional printing ink when used in combination with 100% BRC ink resins and 100% BRC ink additives. The solution provided by the present invention is a combination of biochar and a 100% BRC rosin adduct, which exhibits a comprehensive set of ink performance properties, as described below.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

When the terms "consist of", "consists of" or "consisting of" is used in the body of a claim, the claim term set off with "consist of", "consists of" and/or "consisting of" is limited to the elements recited immediately following "consist of", "consists of" and/or "consisting of", and is closed to unrecited elements related to that particular claim term. The term 'combinations thereof', when included in the listing of the recited elements that follow "consist of", "consists of" and/or "consisting of" means a combination of only two or more of the elements recited.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

Throughout this disclosure, all parts and percentages are by weight (wt % or mass % based on the total weight) and all temperatures are in ° C. unless otherwise indicated.

As used herein, "natural material(s)" are materials that are botanic (plant-based), mineral-based, of animal original, derived from microorganisms, their reaction products, and combinations thereof, and water. Natural materials may be used as they occur in nature, or they can undergo processing that does not significantly alter the original physical, chemical, or biological state of the ingredient. Examples of permissible processing include dehydration, extraction, extrusion, centrifugation, filtration, distillation, grinding, sieving, compression, freezing, drying, milling, etc. Natural materials include, but are not limited to, water, natural resins, natural defoamers, natural waxes, natural colorants, bio-solvents, natural minerals, and the like.

As used herein, "BRC" refers to bio-renewable carbon, which can further be defined as non-ancient carbon (i.e. non-fossil-based carbon) that is part of earth's natural environment. Non-ancient carbon (less than 40,000 years after final atmospheric carbon incorporation) contains radiocarbon ($^{14}C$), whereas ancient (fossil-based) carbon does not contain radiocarbon. BRC refers to naturally occurring renewable resources that can be replenished to replace the portion depleted by usage and consumption, either through natural reproduction, or other recurring processes in a finite amount of time (such as within a human lifetime).

As used herein, "plant-based" refers to materials that contain equal to or greater than 50% of the ingredient mass from plant-based sources.

As used herein, "naturally derived" refers to materials with equal to or greater than 50% natural or biobased origin by molecular weight, based on renewable carbon content.

As used herein, "natural minerals" refers to inorganic materials occurring naturally in the earth, having a distinctive chemical formula and consistent set of physical properties (e.g. crystalline structure, hardness, colors, etc.). Also included are "derived minerals"—materials obtained through chemical processing of inorganic substances occurring naturally in the earth, which have the same chemical composition as natural mineral ingredients (e.g. calcium carbonate, silica, hydrated silica, sodium fluoride, titanium dioxide).

As used herein, "bio-based" refers to materials containing carbon of renewable origin from agricultural, plant, animal, fungi, microorganisms, marine, or forestry materials.

As used herein, "pyrolyzed carbohydrate(s)," "pyrolyzed cellulose," and "biochar" refer to a carbonaceous material obtained by the partial combustion or pyrolysis of vegetable and fruit wastes, bone, horn, ivory, and similar materials. Pyrolysis involves placing the material in a chamber and heating it in the presence of little or no oxygen.

As used herein, "renewable" refers to materials that are part of earth's natural environment. Renewable resources are naturally occurring, and can be replenished to replace the portion depleted by usage and consumption, either through natural reproduction or other recurring processes, in a finite amount of time (such as within a human lifetime).

As used herein, "mixing vehicle," "varnish," and "grind varnish" refer to a composition of the invention that does not contain pigment. A mixing vehicle, varnish, or grind varnish may be mixed with pigment and used as a colored ink or coating, or it may be used as is (i.e. no pigment) as a clear coating.

As used herein, "sustainable" refers to the quality of not being harmful to the environment or depleting natural resources, and thereby supporting long-term ecological balance.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spunbond non-woven fabrics (e.g. consisting of polypropylene, polyester, and the like) glass, ceramic, metal, wood, composites, combinations thereof, and the like. Substrates may have one or more layers of metals or metal oxides, or other inorganic materials. Particularly preferred are non-woven substrates.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

As used herein, "inks and coatings," "inks," and "coatings" are used interchangeably, and refer to compositions of the invention, or, when specified, compositions found in the prior art (comparative). Inks and coatings typically contain resins, solvent, and, optionally, colorants. Coatings are often thought of as being colorless or clear, while inks typically include a colorant.

As used herein, the "face" of a printed or coated substrate refers to the side on which the ink or coating has been applied.

As used herein, the "back" of a printed or coated substrate refers to the side to which no ink or coating has been applied.

As used herein, an "unsaturated compound" is a carbon containing material that contains one or more C=C bonds (carbon-carbon double bonds).

Water-Based Compositions

The present invention uses 100% bio-renewable carbon components to provide water-based black liquid inks with the requisite physical properties to perform within rotogravure and flexographic printing requirements. The unique construction and interplay of materials is the key feature that leads to a fully functional ink product. Although WO 2021/162312 suggests that biochar can be used to pigment finished inks, only pigment dispersions, and not finished inks, are described. Furthermore, WO 2021/162312 does not disclose use of rosin resin adducts in combination with the biochar. The microfibrillated cellulose used in WO 2021/162312 s a particulate form of cellulose that is a polysaccharide that can function as an anticoagulant by intercalating in between pigment particles. It is not soluble in water and will not have the function of a dispersant. Rosin resins used by the present invention are terpene chemicals derived from natural rosins, modified to function as dispersants by adsorbing onto the pigment particles and providing the steric and ionic interactions to prevent the particles from agglomerating. One of ordinary skill in the art would recognize that microfibrillated cellulose and the rosin resin adducts of the present are not equivalent, and cannot be used interchangeably.

Printing inks (and coatings) are a composite of multiple raw materials, each responsible for part of the overall performance, and all must be compatible with each other, insuring chemical stability over time. A person familiar with the art recognizes that a water-based printing ink typically contains about 30-40% carbon containing compounds, equal to or greater than 60% water, and about 1% ammonia. Carbon contribution considers both the amount of carbon containing compounds in a formulation, and the amount of elemental carbon in each individual compound. Representative carbon containing compounds are summarized for relative elemental carbon contribution in Table A.

TABLE A

Carbon contribution of compounds in a water-based ink

| Typical Components of a Water-Based Ink | Typical Component amount used in a Finished ink | Typical Mass % of Elemental Carbon found in component | Relative Elemental carbon Contribution |
| --- | --- | --- | --- |
| Organic Pigment | 16% | 70% | 47.4% |
| Emulsion Resins | 12% | 60% | 30.4% |
| Solution Resins | 5% | 60% | 12.7% |
| Waxes and Modifying Additives | 3% | 75% | 9.5% |
| Water and Ammonia | 64% | 0% | 0% |

The ink and coating compositions of the present invention preferably have a 100% BRC contribution for all elemental carbon containing compounds. That is, it is preferred that no elemental carbon within any component of the invention is less than 100% BRC. Pigment content has been the major challenge to a 100% BRC ink, due to lack of sustainable carbon (dye) intermediates, generally sourced from China, used to manufacture organic pigments. Considering that organic colorants contribute nearly half of the carbon content of a typical liquid ink, this fact would appear to be severely restricting to the construction of a 100% BRC finished ink. Many carbon black pigment and pigment dispersion commercial products containing sustainable carbon content do not attain 100% BRC. One carbon black example of partial sustainable content, yet non-attainment of 100% BRC, is Printex Nature Black by Orion. This lamp process pigment uses incomplete combustion of 100% BRC soy bran waxes to produce a high BRC black pigment, yet the BRC is listed in the literature as 85%. Upon further inspection, natural gas (of ancient origin) is used to augment the combustion process, contributing non-sustainable carbon to the final pigment product.

Microwave susceptibility is known as a benefit for heating foods, yet it is a liability for printed inks. Printed inks (specifically many carbon blacks) often show the production of heat, smoke, sparks, and flames when exposed to microwave energy. Few high purity carbon pigment ancient sources (e.g. petroleum based) are microwave safe, due to very high carbon content. Carbon pigments where oxygen content exceeds 4% tend to be microwave safe, due to the non-susceptor property of oxygen. Biochar pigments derived from recently living organisms typically contain greater than 4% oxygen content (from residual lignin and cellulose structures), and are typically microwave safe.

Compostability is a feature of chemical decomposition via heat, light, chemical reaction, and microbe metabolic activity. While not being bound by theory, the consensus is that components of ink that are closer to a living natural structure tend to be more easily metabolized by microbes than highly chemically modified compounds no longer similar to natural foodstuff structures.

There are special formulary considerations for biochar versus ancient source carbon black pigment in a finished ink. Those considerations include rheology and viscosity stability; applied density (pigment delivery at the desired viscosity); solids at the desired viscosity; and the flexographic and rotogravure delivery to the substrate. All of these performance considerations are based upon cohesion and adhesion interactions between components in the ink. The major differences between biochar carbon and ancient source carbon are the amount of oxygen content (propensity to form hydrogen bonding interactions), and the structural resistance to mechanical disintegration.

Within a finished ink there are attractive hydrogen bonding interactions between resin and pigment. Someone skilled in the art would describe a functional amount of hydrogen bonding chemistries as required on both the resin and pigment. Too little hydrogen bonding would not produce the adhesion and cohesion required for wet delivery from anilox to plate to substrate. On the other hand, if both resin and pigment contain excessive hydrogen bonding structures with geometry to delocalize attractions, the result is elevated viscosity for a given amount of solids present in the composition. Higher viscosity would require greater addition of water to achieve printing viscosity, and loss of pigment percentage (i.e. low applied color strength). In the specific example of the biochar black pigment (as opposed to ancient source carbon black), greater hydrogen bonding character is present as residual oxygen structures from cellulose. This is attenuated with resin choices (e.g. rosin citrate) having one pole of the structure with little/no hydrogen bonding structure. This geometry localizes the pigment attractions (i.e. to the one pole that has more hydrogen bonding).

Formulating for optimal ink rheology is an effort to minimize wet attractions without eliminating those same attractions in a dry printed ink. Biochar pigment must be combined with agents that lower hydrogen bonding, produce greater flow, greater applied solids, and lower viscosity. One such agent to isolate and render less attractive the excess oxygen content of biochar is a 100% BRC rosin adduct, as used in the present invention.

Examples of rosin adduct materials include, but are not limited to, Filtrez rosin fumarates from Lawter, Reactol rosin-based polyester from Lawter, and Amberyl rosin maleates from Polimeros Sinteticos.

In preferred embodiments, the rosin adduct used in the present invention is an anionic modified rosin resin ester. Preparation of the rosin adduct is described in WO 2021/231829. Colophony, consisting of rosin monomer and dimer acids, is initially reacted with a material of the general structure called alpha hydroxy carboxylic acids. Examples of alpha hydroxy carboxylic acids include, but are not limited to, malic acid, lactic acid, tartaric acid, ascorbic acid, citric acid, glycolic acid, 2-hydroxycaproic acid, 2-hydroxycaprylic acid, mandelic acid, phytic acid, and combinations thereof. This initial reaction produces a rosin ester. A second reaction with any number of polyols can yield a higher molecular weight modified rosin ester. Rosin may also be polymerized with any number of unsaturated compounds using a free radical propagation method. A particularly preferred material is a 100% BRC rosin-citrate ester resin. The rosin adduct material is preferably modified with lactic acid.

These 420 to 920 molecular weight modified rosins exhibit one pole of zero hydrogen bonding sites, and another pole with hydrogen bonding sites that cannot interact with more than on biochar particle, eliminating delocalization of attractive forces and elevation of viscosity. In other words, a long string of attractions requires more energy to move than a short and localized point of attraction. Some of examples of rosin-citrate ester resin structures are shown below (from WO 2021/231829).

Rosin-Citrate Ester Resins

| Structure | Name and molecular weight |
|---|---|
| 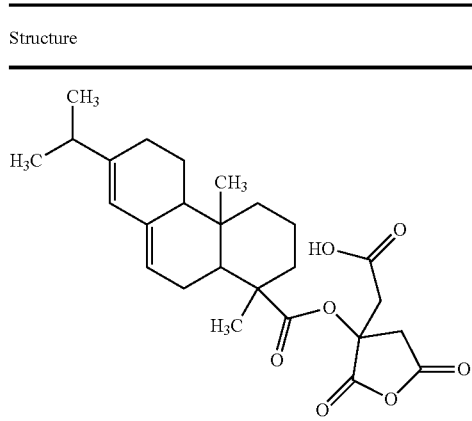 | 2-(3-((7-isopropyl-1,4a-dimethyl-1,2,3,4,4a,4b,5,6,10,10a-decahydrophenanthrene-1-carbonyl)oxy)-2,5-dioxotetrahydrofuran-3-yl)acetic acid $[M - H]^- = 457.2231$ |

-continued

| Structure | Name and molecular weight |
|---|---|
| 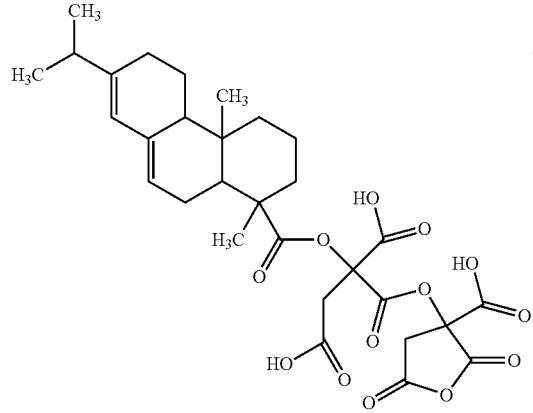 [SMILES: CC(C)C1=CC2=CCC3C(C)(C(=O)OC(CC(=O)O)(C(=O)O)C(=O)OC4(C(=O)O)CC(=O)OC4=O)CCCC3(C)C2CC1] | 2-(((3-carboxy-2,5-dioxotetrahydrofuran-3-yl)oxy)carbonyl)-2-((7-isopropyl-1,4a-dimethyl-1,2,3,4,4a,4b,5,6,10,10a-decahydrophenanthrene-1-carbonyl)oxy)succinic acid<br>$[M - H]^- = 587.2498$ |
| 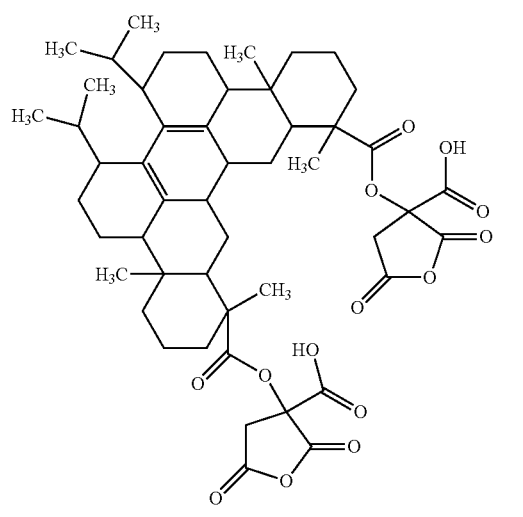 [SMILES: CC(C)C1CCC2C3=C1C1=C4C(CC5C(C)(C(=O)OC6(C(=O)O)CC(=O)OC6=O)CCCC5(C)C4CCC1C(C)C)C3CC1C(C)(C(=O)OC3(C(=O)O)CC(=O)OC3=O)CCCC21C] | 3,3'-((7,8-diisopropyl-1,4a,10b,14-tetramethyl-1,2,3,4,4a,4b,5,6,7,8,9,10,10a,10b,11,12,13,14,14a,15,15a,15b,16,16a-tetracosahydrodibenzo[fg,ij]pentaphene-1,14-dicarbonyl)bis(oxy))bis(2,5-dioxotetrahydrofuran-3-carboxylic acid)<br>$[M - H]^- = 915.4583$ |

Biochar pigment is available commercially, and comes in a range of particle size options. Biochar pigment is dissimilar from ancient carbon black pigment in its high resilience to mechanical disintegration. Biochar tends to absorb mechanical energy without crushing to smaller average particle size, the result being a flexing of the structure, instead of sheering away structure. Use of black pigment in printing inks requires particle size to be reduced to about less than or equal to 1 μm, to optimize the light absorbance efficiency. Established particle reduction techniques exist, known in the ink industry as milling. One common established process for reducing (fracture resistant) particles is a premix step with chemistries that chemically penetrate into micro-fissures. Much like the expansion of a crack in glass, where water penetrates, freezes, and expands, surfactant chemistries have been commonly utilized in the ink industry to chemically penetrate difficult grind pigments, enhancing the mechanical reduction process. It should be noted that the biochar suppliers have additional mechanical techniques and equipment to reduce particle size.

A key attribute of the invention is attainment of a non-pigment solids near 30% at a print viscosity near 28 seconds on a #2 EZ Zhan cup viscometer. There is a complex relation of both solids and viscosity to successful delivery of ink to substrate. Resin solids are the major factor delivering physical performance of a printed ink. Pigment solids (biochar) is the major factor delivering color strength. It is paramount that resin and pigment combinations do not interact to a point of high viscosity and low solids. The present inventive formulations show a low viscosity, high solids compatibility of rosin-citrate ester resin with biochar.

Robust mechanical rub resistance in a printed ink is a combination of surface hardness (determined with a pencil hardness test in the present invention) and flexibility. Optimal flexibility is attained when the glass transition temperature (Tg) of the ink or coating is less than 25° C., so that a film is formed at about room temperature. Most packaging has a typical packaging usage near room temperature, i.e. about 22° C. to about 30° C. When the Tg is lower than room temperature, the polymers and additives will show elasticity and toughness at 25° C. A resin with a Tg that is lower than the packaging use temperature is a film former. If the Tg is higher, e.g. about 50° C., and the package is being mechanically stressed at 30° C., the ink will likely crack/shatter/powder. Conversely, if the Tg is far below the package use temperature, the ink will be more prone to smear and transfer, that when the Tg is close to the usage temperature. This situation can be described as "sticky." Surface hardness is always a mechanical benefit at higher levels, where film formation is present. Historically, flexible packing with a pencil hardness greater than 2H and film formation will display robust mechanical resistance.

Block resistance of a printed substrate is the prevention of transfer of the ink to the non-printed side of the substrate when the substrate is rolled. Persons skilled in the art use laboratory block testing equipment that produces 50 psi, 120° F. (~49° C.) and 66% relative humidity for a duration greater than 72 hours, simulating printed material transit in a hot truck. The printed sample is rolled up, producing a face-to-back configuration, before being loaded into block testing equipment.

Heat resistance is a requirement of many packaging applications, due to use of heated forming equipment. A common duplication of kinetic heat resistance is use of a heated sled (400° F., or ~204° C.) in combination with a Sutherland Rub Tester. A second static heat resistance test utilizes a Sentinel Heat Sealer, where the printed sample is placed between aluminum foil. The foil is subjected to 400° F. and 80 psi, evaluating transfer of ink to foil. The benefit of attaining and confirming heat resistance is prohibiting the transfer and build-up of printed ink on hot forming equipment.

There are additional (specific) performance requirements for unique packaging applications. The fast food industry, for example, places high importance on sustainability and BRC elevation in their packaging. Fast food uses sandwich wraps, carry out bags, folding cartons, polyethylene (PE) cups, and pre-print corrugated packaging. For those applications, the ink must resist soft drink solubility (simulated with a water wetted napkin rub), condiment contact without moving ink, and lack of ink transfer within a stack of nested containers. The ultimate proof of a functional 100% BRC black ink is attaining all required properties simultaneously.

There are several finished ink examples shown in this application that perform well for many common application requirements, using a unique 100% BRC varnish as a grind/mixing vehicle, or as a coating where applicable/required.

In one embodiment, the present invention provides a water-based varnish composition, which can be used as a coating (i.e. as is, and referred to as a coating or a varnish), a pigment grind vehicle, or a mixing vehicle for ink compositions (as referred to in the examples)—use of any of these terms refers to the water-based varnish. The varnish/grind vehicle/mixing vehicle comprises a rosin adduct and water. In some embodiments, the varnish/grind vehicle/mixing vehicle further comprises one or more of L-lactic acid, ammonia, wax, a silicone compound, or a chelating agent.

The varnish/grind vehicle/mixing vehicle typically comprises about 10 wt % to about 30 wt % water, based on the total weight of the varnish. For example, the varnish/grind vehicle/mixing vehicle may comprise about 10 wt % to about 25 wt % water, based on the total weight of the varnish/grind vehicle/mixing vehicle; or about 10 wt % to about 20 wt %; or about 10 wt % to about 15 wt %; or about 15 wt % to about 30 wt %; or about 15 wt % to about 25 wt %; or about 15 wt % to about 20 wt %; or about 20 wt % to about 30 wt %; or about 20 wt % to about 25 wt %; or about 25 wt % to about 30 wt %.

The varnish/grind vehicle/mixing vehicle typically comprises about 10 wt % to about 30 wt % rosin adduct, based on the total weight of the varnish. For example the varnish/grind vehicle/mixing vehicle may comprise about 10 wt % to about 25 wt % rosin adduct, based on the total weight of the varnish/grind vehicle/mixing vehicle; or about 10 wt % to about 20 wt %; or about 10 wt % to about 15 wt %; or about 15 wt % to about 30 wt %; or about 15 wt % to about 25 wt %; or about 15 wt % to about 20 wt %; or about 20 wt % to about 30 wt %; or about 20 wt % to about 25 wt %; or about 25 wt % to about 30 wt %.

When present, the varnish/grind vehicle/mixing vehicle typically comprises about 5 wt % to 15 wt % of an L-lactic acid composition. For example, the varnish/grind vehicle/mixing vehicle may comprise about 5 wt % to about 10 wt % of an L-lactic acid composition, based on the total weight of the varnish/grind vehicle/mixing vehicle; or about 10 wt % to about 15 wt %. The L-lactic acid composition is typically provided as a dispersion/solution in water, comprising about 88 wt % L-lactic acid, and about 22 wt % water.

When present, the varnish/grind vehicle/mixing vehicle typically comprises about 10 wt % to about 30 wt % ammonia composition, based on the total weight of the varnish/grind vehicle/mixing vehicle. For example the varnish/grind vehicle/mixing vehicle may comprise about 10 wt % to about 25 wt % ammonia composition, based on the total weight of the varnish/grind vehicle/mixing vehicle; or about 10 wt % to about 20 wt %; or about 10 wt % to about 15 wt %; or about 15 wt % to about 30 wt %; or about 15 wt % to about 25 wt %; or about 15 wt % to about 20 wt %; or about 20 wt % to about 30 wt %; or about 20 wt % to about 25 wt %; or about 25 wt % to about 30 wt %. The ammonia composition is typically provided as 14.5 Baume ammonia.

Wax may be included in the varnish/grind vehicle/mixing vehicle as a wax suspension, or as micronized wax. Preferably, the wax is a natural wax, containing 75% to 100% BRC. When present, a wax suspension is typically present in an amount of about 1 wt % to 10 wt % wax suspension, based on the total weight of the varnish/grind vehicle/mixing vehicle. For example, the varnish/grind vehicle/mixing vehicle may comprise about 1 wt % to about 5 wt % wax suspension, based on the total weight of the varnish/grind vehicle/mixing vehicle; or about 5 wt % to about 10 wt %. The wax suspension is typically provided as a suspension comprising about 25 wt % wax, and about 75 wt % water. When present, the varnish/grind vehicle/mixing vehicle typically comprises micronized wax in an amount of about 1 wt % to about 5 wt %, based on the total weight of the varnish/grind vehicle/mixing vehicle. Suitable wax suspensions include, but are not limited to, amide wax (e.g. ethylene bistearamide (EBS) wax), erucamide wax, polypropylene wax, paraffin wax, polyethylene wax, polytetrafluoroethylene wax, carnauba wax, soybean wax, and combinations thereof.

When present, the varnish/grind vehicle/mixing vehicle typically comprises about 0.05 wt % to about 1 wt % silicone compound, based on the total weight of the varnish/grind vehicle/mixing vehicle. When present, the varnish/grind vehicle/mixing vehicle typically comprises about 0.5 wt % to about 3 wt % chelating agent, based on the total weight of the varnish/grind vehicle/mixing vehicle. In certain embodiments, the chelating agent is a zinc chelating agent.

In some embodiments, the present invention provides a black pigment dispersion. The black pigment dispersion comprises the mixing vehicle and biochar. In some embodiments, the black pigment may further comprise additional water and surfactant.

The black pigment dispersion typically comprises about 5 wt % to about 20 wt % of the varnish/grind vehicle/mixing vehicle as described above, based on the total weight of the pigment dispersion. For example, the pigment dispersion may comprise about 5 wt % to about 15 wt % varnish/grind vehicle/mixing vehicle, based on the total weight of the pigment dispersion; or about 5 wt % to about 10 wt %; or about 10 wt % to about 20 wt %; or about 10 wt % to about 15 wt %, or about 15 wt % to about 20 wt %.

The black pigment dispersion typically comprises about 10 wt % to about 40 wt % biochar, based on the total weight of the pigment dispersion. For example, the pigment dispersion may comprised about 10 wt % to about 35 wt % biochar, based on the total weight of the pigment dispersion; or about 10 wt % to about 30 wt %; or about 10 wt % to about 25 wt %; or about 10 wt % to about 20 wt %; or about 10 wt % to about 15 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 40 wt %; or about 20 wt % to about 35 wt %; or about 20 wt % to about 30 wt %; or about 20 wt % to about 25 wt %; or about 25 wt % to about 40 wt %; or about 25 wt % to about 35 wt %; or about 25 wt % to about 30 wt %; or about 30 wt % to about 40 wt %; or about 30 wt % to about 35 wt %; or about 35 wt % to about 40 wt %.

When present, the black pigment dispersion typically comprises about 1 wt % to about 5 wt % surfactant, based on the total weight of the pigment dispersion. For example, the black pigment dispersion may comprise about 1 wt % to about 2 wt % surfactant, based on the total weight of the pigment dispersion.

Surfactants are employed to produce wetting and/or equal distributions of dissimilar polarity chemistries. For the combination of biochar pigments within a finished water-based ink, surfactants can have up to a five-fold utility when properly chosen for their hydrophilic-lipophilic (HLP) balance structures. Utility of surfactants includes: 1) during the milling of the pigment to minimal size, surfactants will prevent the (very polar) biochar from re-agglomerating and/or creating greater particle separation; 2) allowing close (sheering) contact with the (relatively lower polarity) rosin-citrate ester resin during the manufacture of the color concentrate (dispersion); 3 maximizing the resin solids of a finished ink at a target viscosity; 4) allowing a uniform thickness of wet ink to transfer to the intended substrate; and 5) maintaining lateral uniformity of color during application to substrate. Surfactants will always have high and low polarity as part of their structure. A best use of surfactants (or no use) is a very complex decision in building finished water-based ink for those skilled in the art.

When additional water is added to the pigment dispersion, it is typically added in an amount of about 10 wt % to about 50 wt %, based on the total weight of the dispersion. For example, water may be added in an amount of about 10 wt % to about 40 wt %, based on the total weight of the dispersion; or about 10 wt % to about 30 wt %; or about 10 wt % to about 20 wt %; or about 20 wt % to about 50 wt %; or about 20 wt % to about 40 wt %; or about 20 wt % to about 30 wt %; or about 30 wt % to about 50 wt %; or about 30 wt % to about 40 wt %; or about 40 wt % to about 50 wt %.

The compositions of the present invention can be applied to any suitable substrate. Preferred substrates include those used for flexible packaging. The substrates can subsequently be used to prepare articles, such as fast food wraps, cups, etc.

EXAMPLES

The present invention is further described by the following non-limiting examples, which further illustrate the invention, and are not intended to, nor should they be interpreted to, limit the scope of the invention.

Examples 1 and 2. Mixing Vehicles

An inventive mixing vehicle was prepared according to the formulation in Table 1.

TABLE 1

| Example 1-100% BRC mixing vehicle | |
|---|---|
| Material | wt % |
| Water | 27.1 |
| 1-Lactic acid 88.0% in water | 10.2 |
| Silicone Defoamer | 0.1 |
| Add while mixing | |
| 100% BRC rosin-citrate ester resin | 23.7 |
| Mix High Speed 30 minutes Until Uniform with some particulates | |
| Add Ammonia Very Slowly While Mixing to pH 6.50 (no Higher) | |
| 14.5 Baume Ammonia | 11.3 |
| Mixture will appear tacky/stringy | |
| Mix 30 Minutes @ pH = 6.50 | |
| Add Rapidly While Mixing | |
| 14.5 Baume Ammonia | 17.1 |
| Add While Mixing in Order | |
| Carnauba Wax Suspension 25% in water | 6.2 |
| BRC EBS Micronized Wax | 2.0 |
| Silicone COF Compound | 0.3 |
| When fully dissolved & pH >9.2, add while mixing | |
| Zinc (Inorganic) Chelating Agent | 2.0 |
| Total | 100 |

The final Example 1 mixing vehicle has a viscosity of 670 cps, as measured using a Brookfield DV-E Viscometer, with a 62 spindle, at 30 rpm and pH=9 at 25° C.

The major performance resin within Example 1 is a 100% BRC rosin-citrate ester resin, with an acid value of 210 mg KOH/g. The Example 1 formula is a wet reaction occurring between lactic acid and the rosin-citrate ester resin, at pH of 6.50. The reaction occurs before the ester is fully neutralized. The lactic acid is believed to create additional ester linkages in the rosin-citrate ester resin, lowering the acid value, elevating molecular weight, and lowering the glass transition temperature (Tg) creating a film forming resin at room temperature (25° C.), from the non-film forming rosin-citrate ester resin. Before reaction with lactic acid the rosin citrate resin had a Tg greater than 35° C., tested as described below, which is a liability for flexibility. After reacting with lactic acid, the final structure was determined by Sun Chemical Eurolab to be a Diels-Alder addition reaction of lactic acid (alpha hydroxyl structure) onto the anhydride sites of the rosin citrate resin, with a Tg below 25° C., resulting in a mechanical benefit of greater flexibility.

Example 2 mixing vehicle is similar to Example 1 mixing vehicle, except that the lactic acid was replaced with additional rosin-citrate ester resin. The formulation of Example 2 is shown in Table 2.

TABLE 2

Example 2-100% BRC mixing vehicle without lactic acid.

| Material | % |
|---|---|
| Water | 34.0 |
| Silicone Defoamer | 0.1 |
| 14.5 Baume Ammonia | 21.4% |
| ADD WHILE MIXING | |
| 100% BRC rosin-citrate ester resin | 34.0 |
| WHEN DISSOLVED ADD IN ORDER WHILE MIXING | |
| Carnauba Wax Suspension 25% in water | 6.2 |
| BRC EBS Micronized Wax | 2.0 |
| Silicone COF Compound | 0.3 |
| ADD WHILE MIXING | |
| Zinc (Inorganic) Chelating Agent | 2.0 |
| Total | 100 |

The final Example 2 mixing vehicle has a viscosity of 85 cps, measured using a Brookfield DV-E Viscometer with a 62 spindle, and pH=9.6 at 25° C.

Example 1 mixing vehicle exhibits the required mechanical strength, whereas Example 2 mixing vehicle does not. Generally, mechanical strength is the product of surface hardness and flexibility. Surface hardness can be measured using the pencil hardness test as described below. Flexibility is assessed via Tg, where one of ordinary skill in the art understands that values lower than 25° C. and greater than 15° C. contribute a mechanical benefit. A composition with a Tg greater than 30° C. may have the drawback of brittleness. A Tg of less than 15° C. may have the drawback of no resistance to mechanical force, in the form of smearing. The Tg property works in conjunction with the pencil hardness. Mechanical strength is most often manifest in printing inks as a resistance to color mobility or scuff. As objects come into contact with printed materials, it is disadvantageous for the dry ink to powder, and likely transfer to skin, clothes, etc. It is advantageous for dry inks to hold together, and flex with impartment of mechanical energy, with no production of shattered ink or ink powder. Example 2 is mechanically inferior to Example 1 due to a higher Tg (less flexibility).

TABLE A

Mechanical benefit of lactic acid modification of rosin-citrate ester resin

| Example Vehicle | Pencil Hardness | Glass Transition Temperature Tg |
|---|---|---|
| Example 1 | 3H | <25° C. Forms Flexible Film at room Temperature |
| Example 2 | 3H | >25° C. does not form a film, powders under mechanical stress |

The chemical modification lowering Tg in Example 1 will ultimately produce the ability to flex (not shatter) and mechanical toughness in the finished ink.

Examples 3 to 5. Biochar Pigment Dispersions

Examples 3 to 5 are biochar color dispersions. The chemical functionality and subsequent finished ink performance are described below. All three biochar black dispersions utilize Example 1 mixing vehicle as part of the chemistry. Example 3 uses an anionic surfactant in combination with Example 1 100% BRC mixing vehicle. Example 4 uses a non-ionic surfactant in combination with Example. Example 5 omits surfactant entirely. The formulations of Examples 3 to 5 are shown in Tables 3 to 5, respectively.

TABLE 3

Example 3-100% BRC black dispersion R4234-81E

| Material | wt % |
|---|---|
| Example 1 100% BRC Mixing Vehicle | 16.2 |
| lignin based polyelectrolyte (Anionic Surfactant) | 3.8 |
| Biochar | 37.8 |
| Water | 42.2 |
| Total | 100 |

Example 3 black dispersion has a viscosity of greater than 45 seconds on a #2 EZ Zahn cup and pH=9.0 at 25° C.

TABLE 4

Example 4-100% BRC black dispersion R4181-96A

| Material | wt % |
|---|---|
| Example 1 100% BRC Mixing Vehicle | 18 |
| Croda Brij L23 (nonionic Surfactant) | 3.0 |
| Biochar | 37.8 |
| Water | 41.2 |
| Total | 100 |

Example 4 black dispersion has a viscosity of 42 seconds on a #2 EZ Zahn cup and pH=9.5 at 25° C.

TABLE 5

Example 5-100% BRC black dispersion 120220-1

| Material | wt % |
|---|---|
| Example 1 100% BRC Mixing Vehicle | 17.3 |
| Biochar | 37.8 |
| Water | 44.9 |
| Total | 100 |

The Example 5 dispersion flows for a short while after blade energy is introduced (60 seconds), then becomes a non-pourable solid. This is known as "setting up." The solid must be stirred to pour. However, finished inks using this color dispersion, described do not set up (i.e. remain pourable). Example 5 has a pH=9.3.

Examples 6 to 8. Finished Inks Using Black Dispersions of Examples 3 to 5

Examples 6 to 8 are finished inks containing the black dispersions of Examples 3 to 5. The formulations of Examples 6 to 8 are shown in Tables 6 to 8, respectively.

TABLE 6

Example 6-100% BRC black finished ink

| Material | wt % |
| --- | --- |
| Example 3 Black Dispersion | 65 |
| Example 1 100 BRC Mixing Vehicle | 35 |
| Total | 100 |

Example 6 finished ink has a viscosity of 31 seconds on a #2 EZ Zahn cup and a pH=9.4 at 25° C.

TABLE 7

Example 7-100% BRC biochar black finished ink R4181-96B

| Material | wt % |
| --- | --- |
| Example 4 Black Dispersion | 65 |
| Example 1 100% BRC Mixing Vehicle | 35 |
| Total | 100 |

Example 7 finished ink has a viscosity of 35 seconds on a #2 EZ Zahn cup and a pH=9.1 at 25° C.

TABLE 8

Example 8-100% BRC biochar black finished ink R4181-96G

| Material | wt % |
| --- | --- |
| Example 5 Black Dispersion | 65 |
| Example 1 100% BRC Mixing Vehicle | 35 |
| Total | 100 |

Example 8 finished ink has a viscosity of 40 seconds on a #2 EZ Zahn cup, and a pH=8.8 at 25° C.

Examples 9 and 10. Biochar Black Pigment Dispersions Based on Prior Art Chemistry Examples 9 to 10 are additional biochar black pigment dispersions based on Aquagreen chemistry. The formulations of Examples 9 and 10 are shown in Tables 9 and 10, respectively. Aquagreen is a commercial ink series from Sun Chemical which has been commercially printed/proven to be functionally robust for the performance properties listed in Tables B, C, and D, for greater than 3 years. These are comparative in that, although having high BRC content, do not achieve 100% BRC content. The inks prepared from the black dispersions of the present invention exhibit properties as good as or better than the high BRC inks prepared from the black dispersions based on commercially available chemistry. Pigment dispersions and inks based on Aquagreen chemistry are the closest prior art. Note that to achieve the required performance properties, the Aquagreen compositions contain high molecular weight resin emulsions. It is noteworthy that the inks of the present invention achieve the required performance without the high molecular weight resin emulsions.

TABLE 9

Example 9 biochar black dispersion R4234-84A

| Material | wt % |
| --- | --- |
| Fumaric modified rosin | 5.6 |
| lignin based polyelectrolyte | 3.8 |
| Biochar | 37.5 |
| Water | 52.9 |
| Defoamer and Biocide | 0.2 |
| Total | 100 |

Example 9 pigment dispersion has a 47.1% total non-volatile content (% TNV), and 96.7% BRC.

TABLE 10

Example 10 black dispersion R4234-008C

| Material | wt % |
| --- | --- |
| lignin based polyelectrolyte | 8.8 |
| Biochar | 29.2 |
| Water | 61.8 |
| Defoamer and Biocide | 0.2 |
| Total | 100 |

Example 11. Comparative Technical (Mixing) Vehicle

Example 11 is a commercially available technical (mixing vehicle). It is GP37000030A Aquagreen Tech Vehicle available from Sun Chemical.

Examples 12 and 13. Comparative Black Finished Inks

Examples 12 and 13 are comparative black finished inks prepared using Examples 9 and 10 black pigment dispersions, and Example 11 mixing vehicle. The formulations of Examples 12 and 13 are shown in Tables 11 and 12.

TABLE 11

Example 12 comparative black finished ink

| Material | wt % |
| --- | --- |
| Example 9 Black Dispersion | 65 |
| Example 11 Commercial vehicle | 35 |
| Total | 100 |

Example 12 comparative finished ink has 45.2% TNV and 82.0% BRC.

TABLE 12

Example 13 comparative black finished ink

| Material | wt % |
| --- | --- |
| Example 10 Black Dispersion | 65 |
| Example 11 Commercial vehicle | 35 |
| Total | 100 |

Example 13 comparative finished ink has a 39.4% TNV and 81.5% BRC.

Example 14. Performance of Finished Inks

The following are qualifications for finished ink utility within flexographic and rotogravure printed substrate applications.

Ambient Wet Stability/Initial Versus 1 Week Viscosity at Room Temperature

A typical water-based printer will find best print performance in a range of viscosity from 18 seocnds to 35 seconds on a #2 EZ Zahn cup viscometer. Non-reduced inks should be formulated to an uncut viscosity within that range. Ink samples are to be vigorously shaken by hand for 10 seconds to assure uniformity. The test is documentation of initial viscosity using a #2 EZ Zhan cup viscometer, followed by documentation of viscosity after 7 days. A viscosity change (gain or loss) of more than 5 seconds is unacceptable.

B. Heated Wet Stability/24 Hour at 120° F. (~49° C.)

This test is identical to the ambient wet stability test, except that wet samples are placed in a 120° F. oven for 24 hours before the second viscosity reading. A viscosity change (gain or loss) of greater than 5 seconds is unacceptable.

C. Color Strength/Applied Density at 25 Seconds Print Viscosity

Inks are reduced to 25 seconds on an #2 EZ Zahn cup using tap water, then applied to C1S bleached paperboard using a 200 line 7.0 BCM hand proofer. Applied inks are dried in a 120° F. convection oven for 60 seconds. An X-Rite 939 (set at Daylight 65, 10 degree observer) is used to determine average density (V) of 3 readings. This is compared to a standard process density of V=1.40 for determination of optimal anilox selection or range. For rotogravure and flexographic applications, a selection of (cylinder or anilox) volume is typically from 1.2 BCM (billion cubic microns) to 15.0 BCM. Attaining an applied color density with a low BCM (called shallow) is much more difficult than using high BCM (deep) options. The 7.0 flexo anilox BCM is a common volume for line artwork, and 2.0 BCM would be common to process artwork.

D. Static Heat Resistance/Sentinel Heat Sealer

The Sentinel heat sealer is set at 40 psi, 400° F., and 1 second duration, using a top heated jaw. Ink is applied as in test C above. The print sample is aligned with the dull side of aluminum foil, the construction is inserted into the jaws of the heat sealer, and the clamping shoe is pressed. The constructions is allowed to cool to room temperature, and the foil is removed from the printed ink surface. No visual transfer of ink to the foil is a passing result.

E. Kinetic Heat Resistance/Sutherland Rub Tester Heated Sled

This test is specific to the heated lamination process used in pre-print corrugated substrates. Ink is applied on the substrate in a 7 inch long, 2 inch wide strip (using the print method described in test C above). The substrate is affixed ink side up to the base of the equipment. A heated sled is warmed to 400° F. The heated sled is pulled on the surface of the print sample, passing from inked to non-ink areas. The test is set for 25 cycles. When complete, the substrate is inspected for transfer of ink to the unprinted areas. Passing performance is no visible ink removal and no color movement to non-ink areas of the substrate.

F. Print Quality/Filament Inspection

Using a gloved (latex glove) hand, wet index finger with an amount of ink the size of a dime. Tap the wet index finger to the thumb in 5 second increments until the ink is dry. Inspect the area between finger and thumb while pulling apart. If a filament (looks like a cobweb) appears, it is an indication of a cohesion/adhesion imbalance in favor of cohesion. Filaments forming between ink plates and anilox or between the gravure cylinder and stock leads to ink being deposited or thrown into non-print areas. A passing result is no visible filaments.

G. Print Quality/Glass Rewetting at pH=9

Apply ink to a glass substrate, using the print method as in C above, allowing the ink to dry on the glass. This simulates the ink drying on the anilox plate if the print run is stopped in the middle of the run for any reason. Prepare a 100 g solution of tap water and monoethanolamine (MEA) to pH=9.0 (0.2% MEA required, depending on tap water source). Holding the glass substrate with the dry ink facing up at a 45 degree angle, pipette 5 ml of the pH 9 solution, and slowly drip onto printed area from 6 inches away. A passing result is full removal of ink from the glass in the drip area. That is, re-wetting of the ink on the glass plate, indicated by removal of the dry ink, is predictive of re-wetting in the anilox-plate interface. If an ink cannot be re-wet this would cause ink build up in the non-image areas, so that ink would be delivered to areas where it should not be, also referred to as dirty print.

H. Print Quality/Gravure 5-Minute Dry then Rewet

Using a Geiger lab gravure press, load 100 grams of ink reduced to 20 seconds #2 EZ Zahn cup into the pan. Turn on the press to 50% speed, with the blade engaged. Pull a test print as the inspection control. Stop the press rotation without releasing the blade. Allow the ink to dry into the cylinder for 15 minutes under ambient conditions. This duplicates the potential power outages and effect on cell plugging. Start press rotation up after the 15 minutes. Allow the Geiger cylinder to rewet for 5 minutes. Pull another print. Inspect for evidence of non-uniform ink delivery. A passing result is when the printed image remains uniform after re-wet, not showing a lower amount of ink delivery in the areas of the etch that contained dry ink.

Block Resistance/Face to Back Ink Transfer

Prepare a 10 inch long by 3 inch wide strip of printed ink on 20 #MG paper (using a print method as described in C above). Roll the print up into a cylinder on a finger. Fold the cylinder flat to a configuration of 1.5 inches by 3 inches. Set the block tester at 120° F., 50 psi, and 66% relative humidity. Placed the flattened substrate cylinder into the block tester, and leave for 24 hours. Upon removal from the block tester, unwrap the sample, inspecting for any ink transfer from the printed face to the unprinted back side of the stock. A passing result is no visible ink transfer to the back side of the stock.

J. Mechanical Scuff/Sutherland Rub

Apply a finished ink with a viscosity of 29 seconds on a #2 EZ Zahn cup on the polyethylene (PE) side of polyethylene coated paper, using a 500 line 4.0 BCM hand proofer, dry in a 120° F. convection oven for 30 seconds, and then allow to cure in ambient conditions for greater than 16 hours. This test is performed using a Sutherland rub tester with a 2 #sled, and set for 25 cycles. The printed sheet is mounted to the 2 #sled (ink side down so that the ink surface is exposed) facing an unprinted PE surface of the same stock, which is mounted onto the Sutherland base. The test consists of 25 cycles of rubbing. nk density was measured with an X-Rite 939 spectrophotometer using the setting D65 light/10 degree observer. A measurement taken from the non-test area (i.e. non-ink transfer) portion of the substrate density is subtracted from the (major contribution V, C, M, Y) measured density of the highest ink transfer area to determine ink transfer only. X-Rite transfer density must be less than 0.100 to pass established/historical print industry mechanical rub requirements. Major color contribution is automatically determined by many densitometers like X-Rite 939. It is the dominant reflectance wavelength of visible light in terms of Yellow (Y), Magenta (M), Cyan (C), and Black (V). An example of dominant absorbance is Magenta for a pink, and Cyan for a dark forest green. Identifying the dominant absorbance wavelength assures that the data includes the color with the highest risk of observed transfer.

K. BRC/ASTM Method D6866

A sample of biochar pigment and Example 1 mixing vehicle were submitted to Beta Analytical, Miami, FL. Both samples attained a 100 BRC rating. The BRC content of the other materials used in the compositions of the present invention are available in a publically available sampling database. The percent contribution of each material in a composition can be calculated by multiplying the % BRC of the material by the wt % in the composition. Note that some items are generally recognized as 100% BRC, e.g. starch.

L. Microwave Safety

Finished ink is applied to 20 #MG sandwich wrap stock, using the printing method described in C above. A 4 inch by 2 inch printed sample is placed in a 1200 Watt microwave oven, and a paper cup with 100 g of water is also placed in the microwave oven (to protect the microwave emitter from burnout). The timer is set for 3 minutes on high setting. The test is stopped at any sign of smoke/spark/flame. If the 3 minutes is completed without incident, the printed sample is removed and inspected for discoloration or heat. A passing result is no evidence of heat, discoloration, sparks, smoke, or flame.

M. Kinetic Water Resistance/Wet Napkin Test

This is a water wetted napkin quantitative mechanical rub transfer test. Ink is applied to 20 #MG sandwich wrap stock, and cured (same method as above). A fully water wetted napokin is pulled laterally oover a 4 inch run of printed stock with a 2 #Sutherland sled on top. A 3 inch by 4 inch piece of copy paper is placed between the sled and the wetted napking to hold all the layers together during the test. The napkin is then dried. The X-rite 939 density (major contribution V, C, M, Y) is taken for non-ink background, and the area of greatest ink transfer. Background density is subtracted from the ink transfer area, to determine the ink only transfer density. Historical ink transfer density values must be less than 0.050 to be acceptable by industry standards.

N. Specific Product Resistance—Condiment

This test evaluates ink transfer to a napkin with gentle hand wipe-away of condiment over printed ink. The PE side of PE coated bleached stock is printed with the inks. The test employed the printed/cured PE side of PE coated stock listed above. Each condiment (ketchup, mustard, mayonnaise, vegetable oil) is placed onto an ink area of printed stock in 1 inch (2.54 cm) diameter circles. After 15 seconds, a napkin is used to remove the condiment. The napkin is inspected for ink transfer, and rated on a 1 to 5 scale: 1=no visible ink transfer; 2=barely perceptible transfer of ink; 3=slight transfer of ink; 4=moderate transfer of ink; 5=excessive transfer of ink. A passing result shows slight to no ink transfer (1-3 rating) on the napkin.

Use of Overprint Varnish (OPV)—Requirements

In some embodiments, the mixing vehicle of the present invention can be used as a 100% BRC coating for applications requiring an overprint varnish, or applications requiring additional resistance properties. For applications that are less than robust for water or mechanical resistance, the mixing vehicle of the present invention is applied at greater than 0.5 #/ream dry application weight, using a 200 line, 7.0 BCM handproofer over the printed area. The coated printed area is then retested for the required properties. Many ink end-use applications have resistance requirements that are very extreme, to a point where overprint varnishes are usually required. An example of one such application that typically utilizes an overprint varnish would be pre-print clamshells or French fry scoops within the fast food packaging market. These packages have OPV on top of printed colors. There is no allowance of any ink transfer where food contact will occur. The French fry scoops are shipped in a nested configuration (long tube one inside the next), where the transfer of ink is never allowed.

Other applications, like cold cups, often have an option of OPV use depending on many end use and processing factors.

P. Pencil Hardness Method

Wet prospective (i.e. to be tested) composition (which can be a single polymer, a vehicle, or a finished ink, as required) is applied to glass using a 1.0 mil Byrd application over a distance of 8 inches. The polymer surface is dried with an air dryer for 30 seconds, or until thoroughly dry to the touch. A control polymer with a known pencil hardness may also be applied in a different area of the glass (each strip should be labeled). The glass is placed over a white paper or surface during test so that the carbon transfer (from the pencil) is not overlooked. A 4B pencil is held comfortably and drawn back and forth over a 1 inch area on top of the test surface. Use very light pressure for a first patch at a 30 degree angle, then use heavy pressure in a second patch at an 80 degree angle (in the same area), but not so heavy that the pencil or graphite tip is broken.

Assess whether the carbon transfer is transferred to the print surface, and whether the surface is altered or destroyed. Assess whether you feel a difference as the polymer is shattered by the pencil. Moving from soft to hard pencils, the first pencil that does not transfer carbon or change the surface of the print is the surface hardness of the resin (4B, 3B, 2B, FB, F, HB, H, 2H, 3H, 4H). When the pencil used is harder than the test surface, the surface may shatter or powder, or the carbon will not transfer. When the surface shatters or powders, it will be apparent on close inspection, and it can be "felt" on the pencil as a destructive vibration. Remember that flexibility is different from surface hardness. A shattered surface may allow carbon transfer. The historical passing result for this test is hardness greater than or equal to 2H.

Q. Film Formation Method

This test is employed to determine whether a polymer will form a film at a desired temperature, such as room temperature (— 25° C.). The polymer is applied to a glass surface and dried. The glass surface is heated to a desired temperature. A series of tests can be done at different temperatures, such as 25° C., 35° C., etc. A razor blade is used to remove the dried polymer from the glass surface. If the polymer comes away in sheets, then the polymer forms a film at the temperature to which the glass was heated. If the polymer powders, then the polymer does not form a film at that temperature. A passing result is film formation at room temperature, with mechanical advantages described earlier.

Results

Finished inks of the invention were tested in several of the performance tests listed above. The results are shown in Tables B, C, and D below.

TABLE B

Dynamic application specifications

| Example | Applied Density X-Rite | Filament Inspection | Glass rewet | Gravure Rewet |
|---|---|---|---|---|
| Ex. 6 (Anionic Surfactant) | 1.57 | None Found | Full ink removal from glass Observed | No Cell Plugging found |
| Ex. 7 (Non-ionic Surfactant) | 1.41 | None Found | Full ink removal from glass Observed | No Cell Plugging found |
| Ex. 8 (No surfactant) | 1.52 | None Found | Full ink removal from glass Observed | No Cell Plugging found |

TABLE C

Intrinsic static properties of finished black ink

| Example | Sentinel HR | Microwave Safe? | Block Resistance | Ambient wet stability |
|---|---|---|---|---|
| Ex. 6 (Anionic Surfactant) | No Ink Transfer to Foil | Yes | No Ink Transfer Found | Ambient viscosity gain = 3 sec 120° F. Viscosity gain = 4 sec (Acceptable) |
| Ex. 7 (Non-ionic Surfactant) | Slight Ink transfer to foil (does not occur with Overprint protection) | Yes | No Ink Transfer Found | Ambient Viscosity gain = 2 sec 120° F. viscosity gain = 2 sec (Acceptable) |
| Ex. 8 (No surfactant) | No Ink Transfer to Foil | Yes | No Ink Transfer Found | No Ambient Viscosity gain 120 F. viscosity gain = 4 seconds (Acceptable) |

Where "overprint" is indicated in Table D, this means that the finished ink was also tested after being overprinted with Example 1 mixing vehicle used as an overprint varnish.

TABLE D

Intrinsic kinetic properties

| Example | Sutherland HR | Sutherland Scuff | Wet Napkin | Condiment |
|---|---|---|---|---|
| Ex. 6 (Anionic Surfactant) | No ink movement to non-Printed areas | Density Transfer V = 0.078 (Pass) | Transfer Density V = 0.054 (marginal). V = 0.012 with Overprint (Pass) | Slight ink transfer with ketchup & Mustard = 3; Mayo & Vegetable oil = 1 (marginal); No ink transfer with Overprint-All condiments = 1 (Pass) |
| Ex. 7 (Non-ionic Surfactant) | No ink movement to non-Printed areas | Density Transfer V = 0.082 (Pass) | Transfer Density V = 0.038 (Pass) | No ink Transfer observed All Condiments = 1 (Pass) |
| Ex. 8 (No surfactant) | No ink movement to non-Printed areas | Density Transfer V = 0.154 (fail). Use of Overprint V = 0.009 (Pass) | Transfer Density V = 0.038 (Pass) | No ink Transfer observed All Condiments = 1 (Pass) |

Performance data shows that all three 100% BRC biochar black inks perform well for intrinsic and dynamic properties listed. Although not optimal on their own in some of the intrinsic kinetic properties, Examples 6 and 8 could be recommended for applications using an over lacquer (i.e. overprint varnish). Examples of current fast food packaging applications that have an over lacquer include folding carton, pre-print corrugated board for clamshells, display materials (e.g. Happy Meals), and cold cups. Example 7 would be a best 100% BRC recommendation for applications where no overprint varnish is available. Non-overprinted fast food applications include carry out bags, sandwich wraps, pinch bottom bags, and direct print clamshells.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A water-based liquid black ink composition comprising water, biochar pigment, and a rosin adduct, wherein the rosin adduct has 100% bio-renewable carbon (BRC) content, based on the carbon content of the rosin adduct; wherein the rosin adduct is a 100% BRC rosin adduct that is a rosin ester, prepared by reacting one or more rosin acid monomers and/or dimers with one or more alpha-hydroxy acids; and wherein the water-based liquid black ink composition has a carbon content; and wherein 70% to 100% of the carbon content in the water-based liquid black ink composition is bio-renewable carbon (BRC).

2. The water-based liquid black ink composition of claim 1, wherein the water, biochar pigment, and rosin are provided as a mixture of:
   (a) 50 wt % to 70 wt % of a black pigment dispersion, based on the total weight of the water-based liquid ink composition, wherein the black pigment dispersion comprises:
      i. 10 wt % to 40 wt % of biochar, based on the total weight of the black pigment dispersion; and
      ii. 5 wt % to 20 wt % of a mixing vehicle, based on the total weight of the black pigment dispersion, wherein the mixing vehicle comprises:
         (1) 10 wt % to 30 wt % water, based on the total weight of the mixing vehicle; and
         (2) 10 wt % to 30 wt % rosin adduct, based on the total weight of the mixing vehicle; and
   (b) an additional 30 wt % to 50 wt % of the mixing vehicle, based on the total weight of the water-based liquid black ink composition.

3. The water-based liquid black ink composition of claim 2, wherein the black pigment dispersion further comprises:
   (a) 1 wt % to 5 wt % surfactant; or
   (b) 10 wt % to 50 wt % additional water; or
   (c) 1 wt % to 5 wt % surfactant and 10 wt % to 50 wt % additional water;
   wherein all amounts are based on the total weight of the biochar pigment dispersion.

4. The water-based liquid black ink of claim 2, wherein the mixing vehicle further comprises:
   (a) 5 wt % to 15 wt % L-lactic acid mixture; or
   (b) 10 wt % to 30 wt % ammonia; or
   (c) 1 wt % to 10 wt % wax suspension; or
   (d) 1 wt % to 5 wt % micronized wax; or
   (e) 0.05 wt % to 1 wt % silicone compound; or
   (f) 0.5 wt % to 3 wt % chelating agent; or
   (g) a combination of (a) and (b); or
   (h) a combination of (a) and (c); or
   (i) a combination of (a) and (d); or
   (j) a combination of (a) and (e); or (k) a combination of (a) and (f); or
(l) a combination of (b) and (c); or
(m) a combination of (b) and (d); or
(n) a combination of (b) and (e); or
(o) a combination of (b) and (f); or
(p) a combination of (c) and (d); or
(q) a combination of (c) and (e); or
(r) a combination of (c) and (f); or
(s) a combination of (d) and (e); or
(t) a combination of (d) and (f); or
(u) a combination of (e) and (f); or
(v) a combination of (a) and (b) and (c); or
(w) a combination of (a) and (b) and (d); or
(x) a combination of (a) and (b) and (e); or
(y) a combination of (a) and (b) and (f); or
(z) a combination of (a) and (c) and (d); or
(aa) a combination of (a) and (c) and (e); or
(bb) a combination of (a) and (c) and (f); or
(cc) a combination of (a) and (d) and (e); or
(dd) a combination of (a) and (d) and (f); or
(ee) a combination of (a) and (e) and (f); or
(ff) a combination of (b) and (c) and (d); or
(gg) a combination of (b) and (c) and (e); or
(hh) a combination of (b) and (c) and (f); or
(ii) a combination of (b) and (d) and (e); or
(jj) a combination of (b) and (d) and (f); or
(kk) a combination of (b) and (e) and (f); or
(ll) a combination of (c) and (d) and (e); or
(mm) a combination of (c) and (d) and (f); or
(nn) a combination of (c) and (e) and (f); or
(oo) a combination of (d) and (e) and (f); or
(pp) a combination of (a) and (b) and (c) and (d); or
(qq) a combination of (a) and (b) and (c) and (e); or
(rr) a combination of (a) and (b) and (c) and (f); or
(ss) a combination of (a) and (b) and (d) and (e); or
(tt) a combination of (a) and (b) and (d) and (f); or
(uu) a combination of (a) and (b) and (e) and (f); or
(vv) a combination of (a) and (c) and (d) and (e); or
(ww) a combination of (a) and (c) and (d) and (f); or
(xx) a combination of (a) and (c) and (e) and (f); or
(yy) a combination of (a) and (d) and (e) and (f); or
(zz) a combination of (b) and (c) and (d) and (e); or
(aaa) a combination of (b) and (c) and (d) and (f); or
(bbb) a combination of (b) and (c) and (e) and (f); or
(ccc) a combination of (b) and (d) and (e) and (f); or
(ddd) a combination of (c) and (d) and (e) and (f); or
(eee) a combination of (a) and (b) and (c) and (d) and (e); or
(fff) a combination of (a) and (b) and (c) and (d) and (f); or
(ggg) a combination of (a) and (b) and (c) and (e) and (f); or
(hhh) a combination of (a) and (b) and (d) and (e) and (f); or
(iii) a combination of (a) and (c) and (d) and (e) and (f); or
(jjj) a combination of (b) and (c) and (d) and (e) and (f); or
(kkk) a combination of (a) and (b) and (c) and (d) and (e) and (f);
wherein all amounts are based on the total weight of the mixing vehicle.

5. The water-based liquid black ink composition of claim 4, wherein the wax suspension comprises 25 wt % wax and 75 wt % water, based on the total weight of the wax suspension.

6. The water-based liquid black ink composition of claim 5, wherein the wax is selected from the group consisting of amide wax, micronized wax, erucamide wax, polypropylene wax, paraffin wax, polyethylene wax, polytetrafluoroethylene wax, carnauba wax, soybean wax, and combinations thereof.

7. The water-based liquid black ink composition of claim 6, wherein the micronized wax is ethylene bis-stearamide micronized wax.

8. The water-based liquid black ink composition of claim 1, wherein the alpha-hydroxy acid is selected from the group consisting of malic acid, lactic acid, tartaric acid, ascorbic acid, citric acid, glycolic acid, 2-hydroxycaproic acid, 2-hydroxycaprylic acid, mandelic acid, phytic acid, and combinations thereof.

9. The water-based liquid black ink composition of claim 1, wherein the rosin ester is further reacted with one or more polyols to yield a higher molecular weight modified rosin ester.

10. The water-based liquid black ink composition of claim 1, wherein the rosin ester is polymerized with an unsaturated compound using a free radical propagation method.

11. The water-based liquid black ink composition of claim 1, wherein the rosin adduct is 100% BRC rosin-citrate ester resin.

12. The water-based liquid black ink composition of claim 11, wherein the rosin-citrate ester resin is modified by further reacting the rosin-citrate ester resin with lactic acid.

13. The water-based liquid black ink composition of claim 1, wherein the water-based liquid black ink composition has a carbon content, and wherein equal to or greater than 80% of the carbon content is BRC, based on the total carbon content of the water-based liquid black ink composition.

14. The water-based liquid black ink composition of claim 1, wherein the water-based liquid black ink composition has a carbon content, and wherein equal to or greater than 90% of the carbon content is BRC, based on the total carbon content of the water-based liquid black ink composition.

15. The water-based liquid black ink composition of claim 1, wherein the water-based liquid black ink composition has a carbon content, and wherein 100% of the carbon content is BRC, based on the total carbon content of the water-based liquid black ink composition.

16. The water-based liquid black ink composition of claim 1, comprising:
(a) 30 wt % to 50 wt % mixing vehicle, based on the total weight of the water-based liquid black ink composition, wherein the mixing vehicle comprises:
  i. 10 wt % to 30 wt % water, based on the total weight of the mixing vehicle;
  ii. 10 wt % to 30 wt % rosin adduct, based on the total weight of the mixing vehicle;
  iii. 5 wt % to 15 wt % of an L-lactic acid mixture, based on the total weight of the mixing vehicle, wherein the L-lactic acid mixture comprises 88 wt % L-lactic acid and 22 wt % water, based on the total weight of the L-lactic acid mixture;
  iv. 10 wt % to 30 wt % of 14.5 Baume ammonia, based on the total weight of the mixing vehicle;
  v. 1 wt % to 10 wt % wax suspension, based on the total weight of the mixing vehicle, wherein the wax suspension comprises 25 wt % wax and 75 wt % water, based on the total weight of the wax suspension;
  vi. 1 wt % to 5 wt % micronized wax, based on the total of the mixing vehicle;

vii. 0.05 wt % to 1 wt % silicone compound, based on the total weight of the mixing vehicle; and viii. 0.5 wt % to 3 wt % zinc chelating agent, based on the total weight of the mixing vehicle; and (b) 50 wt % to 70 wt % black pigment dispersion, based on the total weight of the water-based liquid black ink composition, wherein the black pigment dispersion comprises:

i. 10 wt % to 40 wt % biochar, based on the total weight of the black pigment dispersion;

ii. 1 wt % to 5 wt % surfactant, based on the total weight of the black pigment dispersion;

iii. 5 wt % to 20 wt % of the mixing vehicle of part (a), based on the total weight of the black pigment dispersion; and iv. 10 wt % to 50 wt % additional water, based on the total weight of the black pigment dispersion;

wherein 75% to 100% of the carbon content in the water-based liquid black ink composition is bio-renewable carbon (BRC).

17. A substrate comprising the water-based liquid black ink composition of claim 1.

18. An article comprising the substrate of claim 17.

* * * * *